United States Patent Office 3,686,000
Patented Aug. 22, 1972

3,686,000
MOISTURE RESISTANT SUGAR FILAMENTS
Norman F. Lawrence, Battle Creek, Mich., assignor to General Foods Corporation, White Plains, N.Y.
No Drawing. Filed Jan. 11, 1971, Ser. No. 105,638
Int. Cl. A23g 3/30
U.S. Cl. 99—134 R
12 Claims

ABSTRACT OF THE DISCLOSURE

A moisture resistant material is mixed with sugar prior to formation of sugar filaments employing heat and centrifugal force. The moisture resistant additive incorporated with the heated sugar solidifies upon cooling and yields moisture resistant properties yet permits uniform and controllable sugar dissolving.

BACKGROUND OF THE INVENTION

The present invention is directed to the introduction of an additive material into sugar to yield moisture resistance.

The technique of manufacturing spun sugar floss is well known in the art wherein a source of sugar is applied to the center of a heated rotating bowl to cause sugar filaments to be formed and deposited upon the periphery of this bowl. Additionally, it is recognized in the prior art that sugar floss is highly wettable and that additive materials may be incorporated on the spun filaments to decrease wettability.

Forkner, U.S. Pat. No. 3,221,675 issued Dec. 7, 1965 exemplifies the technique of manufacturing sugar floss by melting a source of sugar and centrifugally spinning the fibers which are collected on the periphery of the rotating container. The patentee teaches during the spinning operation the spraying of an additive upon the sugar floss. The additive that is applied to sugar floss during spinning acts as a coating and includes waxes, fats, oils, gums or gel-forming materials. These additives serve not only as coatings upon the sugar floss, but also serve as bonding materials between filaments. After formation with the coating-bonding material, the product is compressed to reduce the overall bulk volume.

This invention is considered to be an improvement in the technique forming a sugar floss product containing a moisture resistant material.

SUMMARY OF THE INVENTION

The present technique is directed to the formation of sugar filaments that have incorporated essentially uniformly therein a moisture-repellant agent such as a fat, oil, or wax. This incorporated component serves as a moisture barrier when the product is to be stored for prolonged periods of time helping to minimize water absorption from the atmosphere. It is desirable that in prolonged storage a container with a degree of moisture impermeability be employed surrounding the sugar-fat fiber matrix. The present product permits extensive storage times and packaging materials which are not possible with either plain sugar filaments without moisture-repellant properties or sugar filaments with non-uniform and minimum surface water-repellant properties. Additionally, when the sugar filaments of the present disclosure are contacted with a liquid such as water or milk, the filaments will dissolve uniformly in a predetermined time period.

In this technique, a moisture resistant material is chosen which will be a solid state during storage but will liquify at elevated temperature during the spinning temperature. The moisture resistant material is mixed with the sugar prior to the spinning operation. To insure a proper distribution or mixing effect, the moisture resistant material may be applied in a melted condition to the sugar prior to the spinning operation.

After the mixing of the sugar and moisture resistant material, the composition is spun into filaments employing heat and centrifugal action. The composition in filament form is cooled and has the moisture resistant material entrapped in solid form essentially uniformly through the matrix.

It is an object of this invention to produce sugar filaments with moisture resistant properties.

It is a further object of this invention to produce sugar filaments containing a moisture resistant material mixed throughout the sugar matrix.

It is a further object of this invention to produce sugar filaments with moisture resistance that will dissolve uniformly upon contact with a liquid.

It is a further object of this invention to produce sugar filaments with a predetermined controlled rate of dissolving in a liquid.

DETAILED DESIGNATION OF THE INVENTION

This invention allows the incorporation of a component essentially uniformly throughout a mass of sugar filaments yielding moisture resistance. The invention permits use of a minimum amount of moisture impermeable material since unlike the prior art which employs a coating agent, the additive of the present technique is mixed throughout a sugar mass prior to being introduced into a conventional spinning operation to form the sugar floss.

In the prior art, the additive ingredient as in the previously mentioned Forkner patent acts as a coating agent with the purpose to enrobe the sugar. A substantial degree of non-uniformity is obtained during coating, so there are areas with large amounts of surface additive yet other areas without any coating upon the sugar filament substrate. Therefore, as a practical matter with minimum coating material, large exposed sugar surface areas are present which permit undesirable contact with atmospheric moisture.

On the other hand, large amounts of additive surface coating may be applied which act to essentially enrobe the sugar substrate. However, a large excess of coating material is necessary which tends to mask the underlying floss. Additionally, an additive such as a fat may be present in excessively large quantities so that palatability of the product is decreased. This maximum amount of coating agent will provide an excellent barrier to water vapor but also will obstruct penetration of a liquid. Therefore, dissolving with uniformity and in a short time period in a liquid is not possible.

In the filament formed by the present technique, moisture resistance to the water vapor present in the atmosphere is provided while at the same substantially uniform dissolving is obtained in a liquid such as milk. The present article possesses utility as a sweetener for a product compatible with a liquid. For example, a breakfast type cereal is ordinarily eaten with milk and the sugar floss may be added in a form which has appeal to a child. Uniform and swift dissolving may be readily obtained of the sugar in the milk environment. The filaments may be formulated in a manner so that uniform and swift liquid dissolving is obtained or formulated in a manner so that extremely slow filament dissolving takes place. In this latter case, the filament structure will retain its identity for a prolonged time period such as several hours. A mixture of filament compositions may be employed which will add increased attractiveness. For example, a breakfast cereal product eaten with milk may have various types of sugar filaments incorporated therein. A first type of sugar filament could dissolve quickly upon contact with the milk. A second type of filament could dissolve in a five to ten-minute period during the actual consumption of the cereal. A third type could retain its matrix identity for prolonged time periods and would be consumed as a concentrated source of sweetness. For each type of filament, the liquid dissolving properties could be controlled to provide exact product characteristics.

As previously mentioned, conventional spinning apparatus employing heat and centrifugal force is employed in this invention. A suitable disclosure of apparatus is set forth in the previously mentioned Forkner patent. The specific apparatus employed in the formation of the sugar floss does not constitute any portion of this invention. The sole criteria is apparatus that allows heating of the source material with centrifugal action to form the floss.

The added material is mixed with the sugar in a separate step prior to the melting of the sugar to form filaments. The added material that adds decreased wettability to the sugar yet permits uniform dissolving is a solid component at room temperature yet will liquify at the melting temperature of the sugar. Suitable examples of materials that provide a barrier to water are solid fats, solid oils, and waxes. The fats and oils may be either vegetable or animal types. Solid coating materials possessing moisture resistance disclosed in the Forkner patent are suitable as an additive material present in the sugar matrix. The important criteria is that resistance to water is present and that solidification of the added component takes place upon cooling of the sugar floss to room temperature. As a practical matter, the material providing water barrier qualities will be a solid at temperatures up to about 100° F. The material may liquify above this temperature, but in any event will liquify at the sugar spinning temperature.

The types of sugar employed in the present invention are conventional and include various types well known in the art. Suitable examples of such sugar include dextrose and sucrose, although other sugars varying in their refinement are desirable. The sole criteria for the sugar is that it may be formed into sugar filaments by heat and centrifugal action.

The amount of moisture resistant material in conjunction with its water-repellant properties will determine the sugar dissolving time in a liquid. A relatively small quantity of material will give a wide range of dissolving properties. Thus, the bulk of the filament may comprise sugar. The minimum amount of moisture resistant material will ordinarily be about .02% by weight. A very small amount of additive provides resistance to the atmospheric moisture yet permits fast dissolving times. The maximum amount of moisture resistant material in the floss may vary, and amounts of about 7 ot 10% are satisfactory. Greater percentages may add decreased palability as in the case of a fat. A desirable range of additive has been found to be between about .1 to 2% by weight. Within this range, a spectrum of filament dissolving times will take place ranging from minutes to several hours.

Long storage times of the filaments will require a water vapor barrier such as a coated or waxed paper. In such an environment, the sugar floss formed by the disclosed technique will permit extended storage in contrast with plain sugar filaments which will readily absorb moisture. The added moisture resistant material with the sugar permits these storage times with conventional wrapping materials possessing a water vapor barrier. With untreated areas of sugar floss present resulting from no coating or non-uniform coating, expensive packaging containers are necessary to insure against a possibiliy of atmospheric penetration of the package. With cheaper packaging material, the water vapor barrier ordinarily will not be 100% effective and added protection in unprotected sugar filaments would be necessary.

To further illustrate the innovative aspects of this invention, the following examples are provided:

Example 1

A hydrogenated vegetable oil (Durkey Kaorich Beads) was melted and sprayed upon sucrose in a rotating-coating reel. Substantial uniform mixing took place while the oil cooled and solidified. The oil was present in the total mixture of .1% by weight.

The sugar-oil mixture was introduced into a conventional spinning machine with the heater set at a temperature of approximately 400° F. The mixture was spun into a floss in a conventional manner. The product produced was uniform in appearance with sugar and oil throughout the surface. The product in storage possessed resistance to atmospheric moisture. To determine dissolving properties, the sugar filaments were contacted with tap water and dissolved in several minutes.

Example 2

The conditions of Example 1 were repeated except that a 2% weight level of oil was employed. The formulated filament product upon contact with water maintained its filament identity for several hours' duration.

The foregoing description of the invention are merely illustrative of the principles herein. Other modifications will become readily apparent to those in the art. For example, additional additive materials other than those specifically disclosed will become readily apparent. Accordingly, the appended claims are to be construed as defining the invention within the full spirit and scope thereof.

What is claimed is:

1. A method of producing sugar filaments which uniformly dissolve in liquid solvents and which resist wetting on exposure to atmospheric moisture comprising:
    (a) mixing sugar with a moisture resistant material,
    (b) centrifugally spinning the mixture under heated conditions to cause formation of filaments,
    (c) cooling the mixture so that the sugar and additive are both present in a solid form substantially uniformity throughout the the filament.

2. The method of claim 1 wherein said moisture resistant material comprises vegetable oil.

3. The method of claim 1 wherein said moisture resistant material comprises animal fat.

4. The method of claim 1 wherein said moisture resistant material comprises wax.

5. The method of claim 1 wherein said moisture resistant material is present in an amount at least about .02% by weight based on said sugar and said material.

6. The method of claim 5 wherein said moisture resistant material is present in an amount between about .1% to 2% by weight based on said sugar and said material.

7 A sugar filament which uniformly dissolves in liquid solvents and which resists wetting on exposure to atmospheric moisture comprising a substantially uniform matrix of sugar and moisture resistant material.

8. The sugar filament of claim 7 wherein said moisture resistant material is present in an amount at least about .02% by weight based on said sugar and said material.

9. The filament of claim 8 wherein said moisture resistant material is present in an amount between about .1% to 2% by weight based on said sugar and said material.

10. The filament of claim 8 wherein said moisture resistant material comprises vegetable oil.

11. The filament of claim 8 wherein said moisture resistant material comprises animal fat.

12. The filament of claim 8 wherein said moisture resistant material comprises wax.

References Cited

UNITED STATES PATENTS

| | | | |
|---|---|---|---|
| 3,557,717 | 1/1971 | Chivers | 107—54 F |
| 3,557,718 | 1/1971 | Chivers | 107—54 F |
| 3,615,671 | 10/1971 | Shoaf | 107—54 R |
| 3,221,675 | 12/1965 | Forkner | 99—134 R |
| 3,208,858 | 9/1965 | Crossley | 99—134 R |
| 2,553,757 | 5/1951 | Evans | 99—138 S |

MORRIS O. WOLK, Primary Examiner

S. MARANTZ, Assistant Examiner

99—141; 127—29, 46 R